United States Patent
Sato et al.

(10) Patent No.: US 7,918,438 B2
(45) Date of Patent: Apr. 5, 2011

(54) VIBRATION ISOLATOR, AND METHOD OF MOUNTING THE SAME

(75) Inventors: Shunji Sato, Yokohama (JP); Katsumi Ishida, Seto (JP)

(73) Assignees: Bridgestone Corporation, Tokyo (JP); Toyota Jidosha Kabushiki Kaisha, Aichi-ken (JP)

( * ) Notice: Subject to any disclaimer, the term of this patent is extended or adjusted under 35 U.S.C. 154(b) by 595 days.

(21) Appl. No.: 11/949,937

(22) Filed: Dec. 4, 2007

(65) Prior Publication Data
US 2008/0143029 A1 Jun. 19, 2008

(30) Foreign Application Priority Data
Dec. 4, 2006 (JP) .................................. 2006-326839

(51) Int. Cl.
*F16M 13/00* (2006.01)

(52) U.S. Cl. .................................. 267/140.13; 248/634

(58) Field of Classification Search ............. 267/140.11, 267/140.13, 141.1, 293, 294; 248/634, 635; 296/35.1
See application file for complete search history.

(56) References Cited

U.S. PATENT DOCUMENTS

| 1,998,206 | A | * | 4/1935 | Rosenzweig | 248/621 |
| 5,170,985 | A | * | 12/1992 | Killworth et al. | 248/635 |
| 5,580,028 | A | * | 12/1996 | Tomczak et al. | 248/634 |
| 5,743,509 | A | * | 4/1998 | Kanda et al. | 248/635 |
| 6,523,817 | B1 | * | 2/2003 | Landry, Jr. | 267/141.4 |
| 7,261,365 | B2 | * | 8/2007 | Dickson et al. | 296/190.07 |
| 7,389,977 | B1 | * | 6/2008 | Fernandez et al. | 267/141.4 |

FOREIGN PATENT DOCUMENTS

| JP | 1-141937 U | 9/1989 |
| JP | 6-50135 B | 2/1990 |
| JP | 2-309028 A | 12/1990 |
| JP | 7-083267 A | 3/1995 |
| JP | 8-014298 B2 | 2/1996 |
| JP | 10-267084 A | 10/1998 |
| JP | 2002-147530 A | 5/2002 |

* cited by examiner

*Primary Examiner* — Christopher P Schwartz
(74) *Attorney, Agent, or Firm* — Sughrue Mion, PLLC

(57) ABSTRACT

A dynamic damper containing a mass and an elastic connector is connected to an inner tube to provide the dynamic damper integrally as a part of an apparatus. Since the dynamic damper is integrally provided as part of the apparatus (cab mount) by connecting the dynamic damper containing the mass and the elastic connector to the inner tube via a connecting member in the cab mount, it is possible to eliminate work for assembling the dynamic damper separately from the cab mount. Further, the dynamic damper may be constructed integrally as part of the cab mount.

15 Claims, 3 Drawing Sheets

FIG. 3
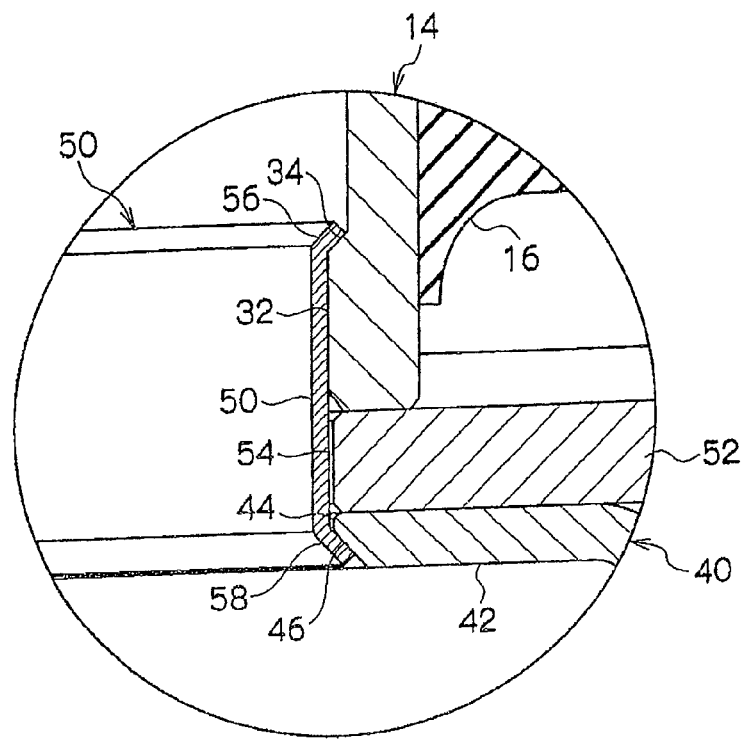
(A)
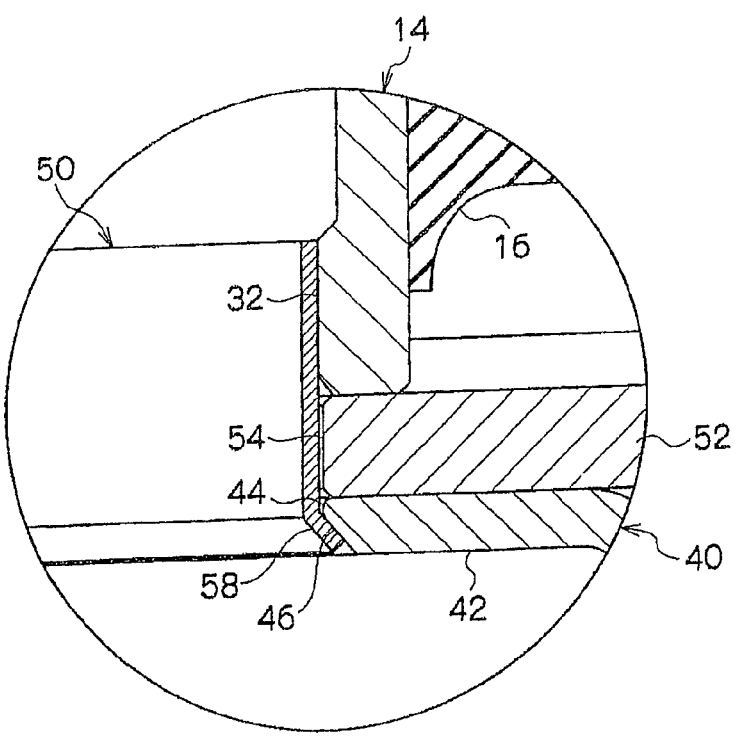
(B)

VIBRATION ISOLATOR, AND METHOD OF MOUNTING THE SAME

BACKGROUND

1. Technical Field

The present invention relates to a vibration isolator for supporting a load and preventing transmission of vibration between one member of a vibration generating section and a vibration receiving section and the other member of the vibration generating section and the vibration receiving section, and to a method for mounting the same.

2. Related Art

Lightweight trucks and some passenger cars have a body provided with a lower traveling body and a cabin (cab), i.e., a driver's room, mounted thereon. In such weight trucks, the cab is mounted on the body through an intermediary of a vibration isolator having a vibration isolating function so that vibration caused during operation and traveling can not be transmitted from the body to the cab.

One described in Japanese Patent Application Laid-Open No. H6-50135 (Patent Literature 1) has been known as a vibration isolator used for the use described above. The vibration isolator described in Patent Literature 1 has a cylindrical body (outer tube) whose one end is closed, an inner tube disposed inside of the outer tube, an elastic body (rubber-like elastic body) attached to the outer tube to suppress a displacement in a radial direction of the inner tube that penetrates movably in an axial direction with respect to the outer tube, damper solution stored in a liquid chamber within the outer tube and a damper member fixed to an lower end of the inner tube and is soaked into the damping fluid.

In the weight truck and the like described in Patent Literature 1, the body is provided with a mounting hole formed so as to penetrate through in the axial direction and the vibration isolator is fixed on the body through a plurality of flanges extending from the lower end of the outer tube to an outer peripheral side while inserting a lower part of the vibration isolator (a lid part formed by closing the lower end of the outer tube) into the mounting hole. The vibration isolator is also provided with a plate that is fixed to an upper end of the inner tube and that creates an air chamber between the outer tube is fastened and fixed to the cab. Thereby, the vibration isolator of the Patent Literature 1 supports an inputted load by spring reaction force of an air spring and it blocks and damps vibrations by the spring reaction force of the air spring and by viscous resistance that is applied to the damping member from the damping fluid.

There has been also known an apparatus provided integrally with a dynamic damper as a vibration isolator as described in Japanese Patent Application Laid-Open No. 2002-147530 (Patent Literature 2). The vibration isolator described in Patent Literature 2 is constructed as a so-called bush type and has an inner tube, an outer tube elastically connected to the inner tube through an intermediary of a rubber-lie elastic member, a mass disposed on an outer peripheral side of the outer tube and an elastic connector for elastically connecting the mass with the outer tube. It is possible to efficiently reduce a total manufacturing cost by integrally constructing the vibration isolator and the dynamic damper as the vibration isolator described in Patent Literature 2.

One described in Japanese Patent Application Laid-Open No. H10-267084 (Patent Literature 3) has been also known as a vibration isolator provided with a dynamic damper.

By the way, when the vibration isolator is integrated with the dynamic damper, it is necessary to connect the dynamic damper (the elastic connector and the mass) to the other end of the inner tube to reduce resonance vibration of the cab when one end of the inner tube is connected to the cab as the vibration isolator described in Patent Literature 1. However, it is difficult to connect the dynamic damper to the inner tube while avoiding interference with the outer tube, the body and fastening members such as a bolt in the vibration isolator as described in Patent Literature 1.

Then, the vibration isolator is disposed normally between the body and the cab and the dynamic damper is assembled separately to the cab to reduce the vibration in the weight trucks and the like using the vibration isolator as described in Patent Literature 1. Therefore, works for assembling the vibration isolator and the dynamic damper respectively to the weight trucks and the like have been required, increasing a number of their assembling steps, and it has been difficult to reduce the total manufacturing cost.

Accordingly, in view of the facts described above, it is an object of the invention to provide a vibration isolator, and its mounting method, in which a dynamic damper containing a mass and an elastic connector is connected to an inner tube so as to be able to provide the dynamic damper as a part of the apparatus.

SUMMARY OF THE INVENTION

In order to achieve the object described above, according to a first aspect of the invention, a vibration isolator includes: an outer tube connected to one of a vibration generating section or a vibration receiving section; an inner tube disposed inside of the outer tube and connected to the other one of the vibration generating section or the vibration receiving section; an elastic body disposed between the outer tube and the inner tube to elastically connect the outer tube and the inner tube; a substantially cylindrically shaped supporting member disposed outside in the axial direction of the inner tube; a cylindrical connecting member, a first end thereof being inserted to fit into an inner peripheral side of the inner tube and a second end thereof being inserted to fit into an inner peripheral side of the supporting member, the supporting member being connected with the inner tube to displace together; a mass disposed on an outer peripheral side of the supporting member; and an elastic connector fixed to the supporting member to the mass so as to elastically connect the mass with the connecting member.

According to the vibration isolator of the first aspect of the invention, the vibration generating section is connected with the vibration receiving section through the elastic body, so that when vibration occurs in the vibration generating section, it is possible to reduce the vibration that would otherwise be transmitted to the vibration generating section to the vibration receiving section because the elastic body can damp and absorb the vibration through its elastic deformation.

Furthermore, according to the vibration isolator of the first aspect of the invention, one end of the connecting member is fitted into the inner peripheral side of the inner tube and the other end of the connecting member is fitted into the inner peripheral side of the supporting member, thereby connecting the supporting member to the inner tube via the connecting member. The mass and the elastic connector are hence connected to the inner tube via the connecting member and the supporting member. It is therefore possible to reliably transmit the vibration caused in the other one of the vibration generating section or the vibration receiving section to the elastic connector and the mass via the connecting member and the supporting member.

Since the mass and the elastic connector function as a dynamic damper, by suitably setting the weight of the mass and the rigidity of the elastic connector so as to correspond to the resonance frequency of the other one of the vibration generating section or the vibration receiving section at this time, resonance vibration is also generated in the mass when the other one of the vibration generating section or the vibration receiving section causes vibration of the resonance frequency. The vibration level of the resonance vibration caused in the other one of the vibration generating section or the vibration receiving section may hence be effectively reduced by inertia force of the mass.

As a result, according to the vibration isolator of the first aspect of the invention, it is possible to provide the dynamic damper containing the mass and the elastic connector as a part of the apparatus, by connecting the mass and the elastic connector to the inner tube, and thereby to eliminate work for assembling the dynamic damper separately from the vibration isolator. Therefore, it is possible to reduce the total manufacturing cost of the vibration isolator and the dynamic damper.

Furthermore, according to a second aspect of the invention, the vibration isolator in the first aspect further includes a first anchored section formed at a region of the inner peripheral surface of the inner tube corresponding to the first end of the connecting member, the first anchored section being formed by an increase in the inner diameter of the inner tube, a second anchored section formed at a region of the inner peripheral surface of the supporting member corresponding to the second end of the connecting member, the second anchored section being formed by an increase in the inner diameter of the supporting member, a first anchoring section formed so that there is an increase in diameter of the connecting member to the outer peripheral side at the first end of the connecting member, the first anchoring section anchoring the first anchored section and a second anchoring section formed so that there is an increase in the diameter of the connecting member to the outer peripheral side at the second end of the connecting member, the second anchoring section anchoring the second anchored section.

Furthermore, according to a third aspect of the invention, the vibration isolator in the second aspect may be arranged such that at least one of the first or the second anchoring sections is formed by crimping the connecting member while the connecting member is inserted to fit into the inner peripheral side of the inner tube or into the inner peripheral side of the supporting member.

Furthermore, according to a fourth aspect of the invention, the vibration isolator in the first aspect may be arranged such that the first end of the connecting member is fixed to the inner peripheral side of the inner tube by press-fitting.

Furthermore, according to a fifth aspect of the invention, the vibration isolator in any one of the first through fourth aspects may be arranged such that a rebound stopper formed into a ring having a larger external diameter than a diameter of the outer tube is disposed on the outer peripheral side of the connecting member, the rebound stopper being sandwiched and fixed between the inner tube and the supporting member.

Furthermore, according to a sixth aspect of the invention, the vibration isolator in any one of the first through fifth aspects may be arranged such that there is a stay portion formed curving around to extend out to the outer peripheral side at the axial end of the outer tube that is on the opposite end from that of the connecting member, and the outer tube is connected and fixed to one of the vibration generating section or the vibration receiving section via the stay portion.

According to a seventh aspect of the invention, a method for mounting a vibration isolator including: an outer tube connected to one of a vibration generating section or a vibration receiving section, an inner tube disposed inside of the outer tube and connected to the other one of the vibration generating section or the vibration receiving section, an elastic body disposed between the outer tube and the inner tube to elastically connect the outer tube and the inner tube, a substantially cylindrically shaped supporting member disposed outside in the axial direction of the inner tube, a mass disposed on an outer peripheral side of the supporting member and an elastic connector fixed to the supporting member and to the mass so as to elastically connect the mass with the supporting member. The method includes: connecting the supporting member and the inner tube so that the supporting member displaces together with the inner tube by inserting a first end of a connecting member to fit into an inner peripheral side of the inner tube, and by inserting a second end of the connecting member to fit into an inner peripheral side of the supporting member; and then mounting the supporting member and the inner tube that have been connected together to the other one of the vibration generating section or the vibration receiving section.

Furthermore, according to an eighth aspect of the invention, the method for mounting the vibration isolator in the seventh aspect may be arranged such that it further includes: forming a first anchoring section by an increase of a diameter of the first end of the connecting member to an outer peripheral side so that the first end of the connecting member is anchored to a first anchored section, the first anchored section being formed at a region of the inner peripheral surface of the inner tube corresponding to the first end of the connecting member by an increase in a part of an inner diameter of the inner tube; and forming a second anchoring section by an increase of a diameter of the second end of the connecting member to the outer peripheral side so that the second end of the connecting member is anchored to a second anchored section, the second anchored section being formed at a region of the inner peripheral surface of the supporting member corresponding to the second end of the connecting member by an increase in a part of an inner diameter of the supporting member.

Furthermore, according to a ninth aspect of the invention, the method for mounting the vibration isolator in the eighth aspect may be arranged such that at least one of the first or the second anchoring sections is formed by crimping the connecting member while the connecting member is inserted to fit into the inner peripheral side of the inner tube or the inner peripheral side of the supporting member.

Furthermore, according to a tenth aspect of the invention, the method for mounting the vibration isolator in the eighth aspect may be arranged such that the connecting member is fixed to the inner tube by press fitting the first end of the connecting member into the inner peripheral side of the inner tube.

Furthermore, according to an eleventh aspect of the invention, the method for mounting the vibration isolator in any one of the seventh to tenth aspects may be arranged such that a rebound stopper formed into a ring having a larger external diameter than that of the outer tube is disposed on the outer peripheral side of the connecting member, the rebound stopper being sandwiched and fixed between the inner tube and the supporting member.

Furthermore, according to a twelfth aspect of the invention, the method for mounting the vibration isolator in any one of the seventh through eleventh aspects may be arranged such that the method further includes bending and forming a stay portion to extend out to the outer peripheral side at the axial end of the outer tube that is on the opposite end from that of the connecting member, and mounting the supporting member and the inner tube that have been connected together to the other one of the vibration generating section or the vibration receiving section by a fastening member which connects and fixes the outer tube to one of the vibration generating section or the vibration receiving section via the stay portion and which penetrates through a hollow hole of the connecting member.

According to a 13$^{th}$ aspect of the invention, a vibration isolator includes: an outer tube connected to one of a vibration generating section or a vibration receiving section; an inner tube disposed inside of the outer tube and connected to the other one of the vibration generating section or the vibration receiving section; an elastic body disposed between the outer tube and the inner tube to elastically connect the outer tube and the inner tube, a substantially cylindrically shaped supporting member disposed outside in the axial direction of the inner tube; a mass disposed on an outer peripheral side of the supporting member; and an elastic connector fixed to the supporting member and to the mass so as to elastically connect the mass with the supporting member, wherein the supporting member is connected with the inner tube so that the supporting member displaces together with the inner tube by inserting a first end of a connecting member to fit into the inner peripheral side of the inner tube and by inserting a second end of the connecting member to fit into the inner peripheral side of the supporting member, and then the supporting member and the inner tube that have been connected together are mounted to the other one of the vibration generating section or the vibration receiving section by a fastening member which penetrates through a hollow hole of the connecting member.

Furthermore, according to a 14$^{th}$ aspect of the invention, the vibration isolator in the 13$^{th}$ aspect may be arranged such that a first anchoring section is formed by an increase in a diameter of the first end of the connecting member to an outer peripheral side so that the first end of the connecting member is anchored to a first anchored section, the first anchored section being formed at a region of the inner peripheral surface of the inner tube corresponding to the first end of the connecting member by an increase in a part of an inner diameter of the inner tube; and a second anchoring section is formed by an increase in a diameter of the second end of the connecting member to the outer peripheral side so that the other end of the connecting member is anchored to a second anchored section, the second anchored section being formed at a region of the inner peripheral surface of the supporting member corresponding to the second end of the connecting member by an increase in a part of an inner diameter of the supporting member.

According to a 15$^{th}$ aspect of the invention, the vibration isolator in the inner cylindrical fitting 14$^{th}$ aspect may be arranged such that at least one of the first or second anchoring sections is formed by crimping the connecting member while the connecting member is inserted to fit into the inner peripheral side of the inner tube or the inner peripheral side of the supporting member.

According to a 16$^{th}$ aspect of the invention, the vibration isolator in the inner cylindrical fitting 14$^{th}$ aspect may be arranged such that the connecting member is fixed to the inner tube by press fitting the first end of the connecting member into the inner peripheral side of the inner tube.

According to a 17$^{th}$ aspect of the invention, the vibration isolator in any one of the 13$^{th}$ through 16$^{th}$ aspects may be arranged such that a rebound stopper formed into a ring having a larger external diameter than that of the outer tube is disposed on the outer peripheral side of the connecting member, the stopper being disposed sandwiched and fixed between the inner tube and the supporting member.

According to an 18$^{th}$ aspect of the invention, the vibration isolator in any one of the 13$^{th}$ through 17$^{th}$ aspects may be arranged such that a stay portion is bent and formed to extend to the outer peripheral side at the axial end of the outer tube that is at the opposite end from that of the connecting member, and the supporting member and the inner tube that have been connected together are mounted to the other one of the vibration generating section and the vibration receiving section by a fastening member which connects and fixes the outer tube to one of the vibration generating section or the vibration receiving section via the stay portion and which penetrates through a hollow hole of the connecting member.

As described above, according to the vibration isolator and the mounting method thereof of the invention, it is possible to connect the dynamic damper containing the mass and the elastic connector to the inner tube and to provide the dynamic damper integrally as a part of the apparatus.

BRIEF DESCRIPTION OF THE DRAWINGS

FIGS. 3A and 3B are section views along the axial direction showing structures of an inner cylindrical fitting and a supporting fitting connected from each other by a connecting fitting in the cab mount shown in FIG. 1.

DETAILED DESCRIPTION

A vibration isolator of an embodiment of the invention will be explained with reference to the drawings.

Structure of Embodiment

Figure 1:
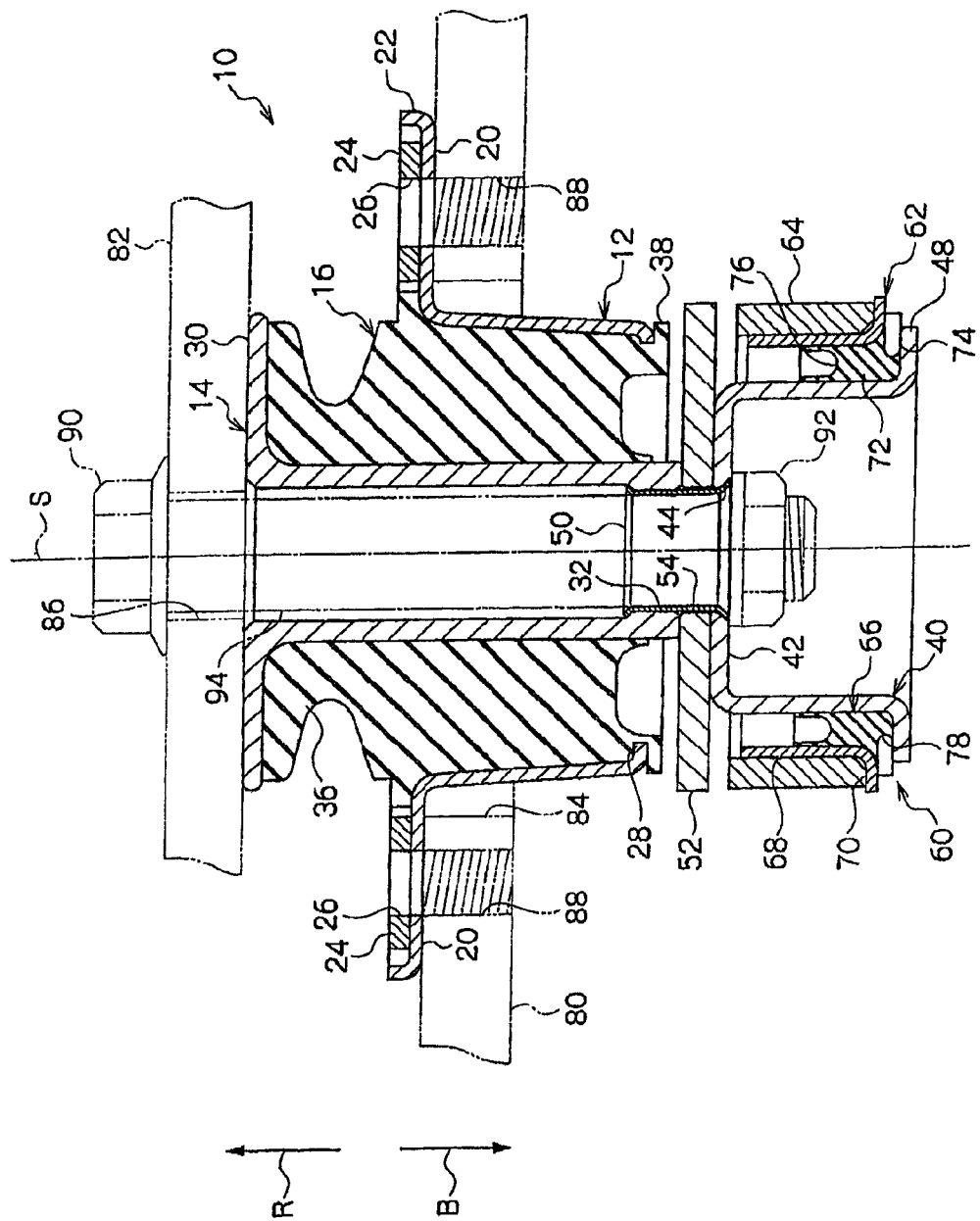
FIG. 1 is a section view along an axial direction showing a cab mount of an embodiment of the invention and a structure of a section of mounting section of the cab mount to weight trucks and others.
Figure 2:
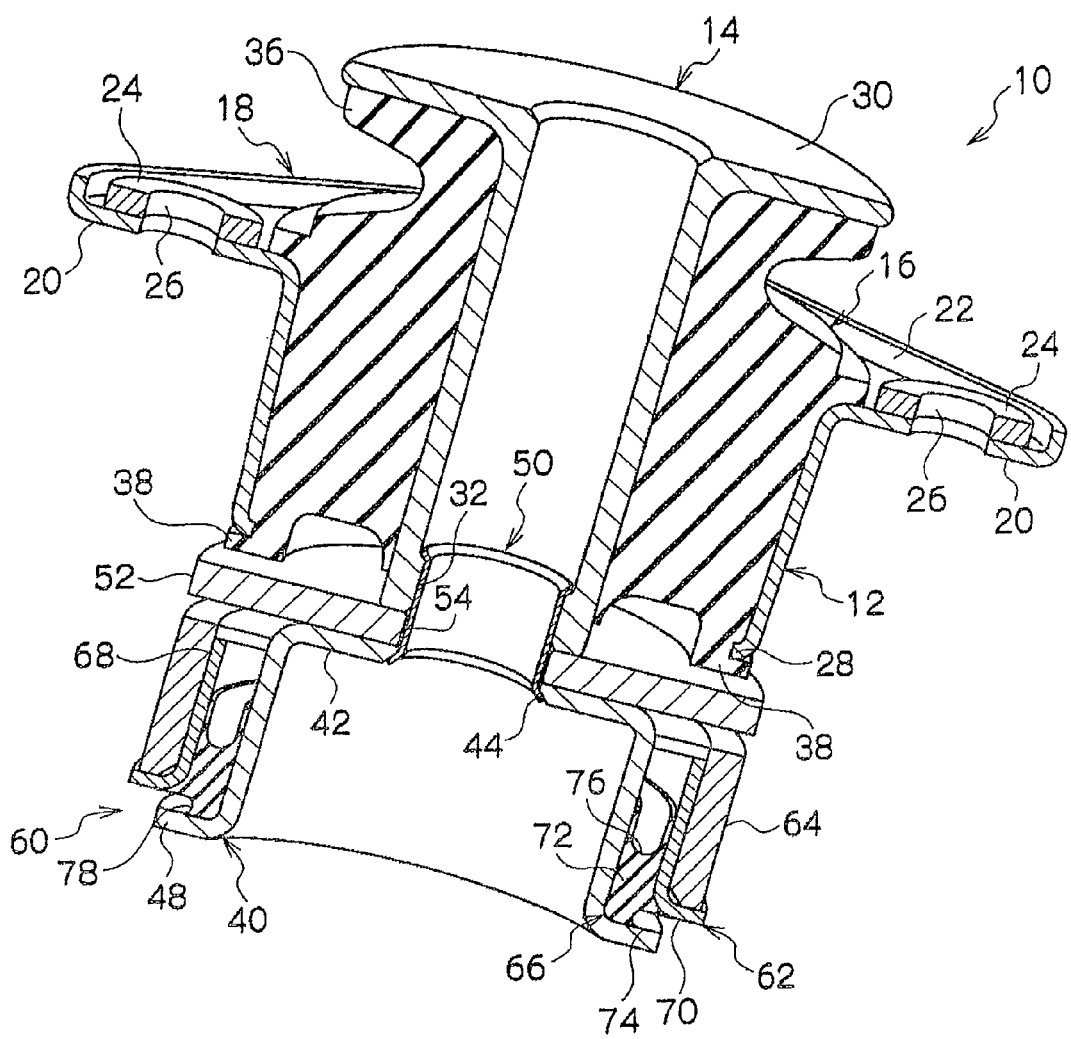
FIG. 2 is a partially sectional perspective view showing the structure of the cab mount shown in FIG. 1.

FIGS. 1 and 2 show a cab mount, i.e., the vibration isolator of the embodiment of the invention. The cab mount 10 is disposed between a car body 80, i.e., a lower traveling body of a truck and a part of passenger cars, and a cab 82, i.e., a drivers' cabin to mount the cab 82 on the car body 80 in a manner of vibration-free.

As shown in FIG. 2, the cab mount 10 is formed substantially into a columnar shape as a whole. The cab mount 10 is provided with an outer cylindrical fitting 12 formed substantially into a cylindrical shape and disposed on an outer peripheral side of the cab mount 10 and with an inner cylindrical fitting 14 formed substantially into a columnar shape and disposed coaxially with the outer cylindrical fitting 12 on an inner peripheral side thereof. It is noted that a reference character S denotes an axial center of the outer cylindrical fitting 12 and the inner cylindrical fitting 14 and the following explanation will be made by defining a direction along this axial center S as an axial direction of the unit.

The cab mount 10 is provided with an elastic body 16 formed into a thick cylindrical shape and disposed between the outer cylindrical fitting 12 and the inner cylindrical fitting 14. An outer peripheral face of the elastic body 16 is vulcanized and bonded with inner peripheral face of the outer cylindrical fitting 12 and the inner peripheral surface thereof is vulcanized and bonded with the outer peripheral surface of the inner cylindrical fitting 14. Thereby, the outer cylindrical fitting 12 is elastically connected with the inner cylindrical fitting 14 by the elastic body 16.

As shown in FIG. 2, the outer cylindrical fitting 12 is provided with a ringed flange 18 formed in a body by bending one end thereof along the axial direction (upper end in FIG. 2) to the outer peripheral side thereof and with a pair of stays 20 formed in a body and extending from both ends in a radial direction of the flange portion 18 respectively to the outer peripheral side. The pair of stays 20 extends to the opposite side from each other along the radial direction centering on the S. A reinforcing rib 22 is formed bended upward at an outer peripheral edge of the flange portion 18 and the pair of stays 20. Furthermore, a reinforcing ring 24 is fixed on an upper face of and an edge of the stay 20 by welding and the like. A circular connecting hole 26 that penetrates in the axial direction is perforated through the center part of the reinforcing ring 24 and the stay 20. The outer cylindrical fitting 12 is also provided with a rib-like stopper receiver 28 by bending a lower part of the outer cylindrical fitting 12 toward the inner peripheral side.

A size of the inner cylindrical fitting 14 along the axial direction is longer than that of the outer cylindrical fitting 12 and upper and lower ends thereof project out of upper and lower ends of the outer cylindrical fitting 12. The inner cylindrical fitting 14 is provided with a ringed flange 30 formed in a body and extending toward an outer peripheral side of the upper end of the inner cylindrical fitting 14. The inner cylindrical fitting 14 is provided with a fitting section 32 whose inner diameter is reduced with respect to the upper end side at the lower end side of the inner peripheral surface of the fitting section 32 and an anchored portion 34 formed aslant so that its inner diameter is tapered and expands toward an upper end portion of the fitting section 32 as shown in FIG. 3A.

It is noted that the flange portion 30 may be formed integrally with the inner cylindrical fitting 14 or may be formed as a separate part and be combined in a body with a piped body by welding or the like to form the inner cylindrical fitting 14.

As shown in FIG. 2, the elastic body 16 has a bound cushion 36 formed so as to extend upward from its upper end and to cover a lower face of the flange portion 30. The elastic body 16 is also provided with a rebound cushion 38 formed so as to extend downward from its outer peripheral side of a lower end and to cover a lower face side of a stopper receiver 28.

The cab mount 10 is provided with a cylindrical support fitting 40 disposed under the inner cylindrical fitting 14 coaxially along the axial direction. A top face side of the supporting fitting 40 is closed by a top plate 42 and inner and outer diameters of the supporting fitting 40 are smaller than those of the outer cylindrical fitting 12 and larger than those of the inner cylindrical fitting 14. A circular connecting hole 44 that penetrates through in the axial direction is formed at the center of the top plate 42 and an inner peripheral surface of the connecting hole 44 is a anchored section 46 formed aslant so that its inner diameter is tapered and expands from its upper end portion to the lower end portion as shown in FIG. 3A. Here, an inner diameter (minimum diameter) of an upper end of the connecting hole 44 is substantially equal to an inner diameter of the fitting section 32 in the inner cylindrical fitting 14. Furthermore, the supporting fitting 40 is provided with a flange-like damper stopper 48 formed by bending a lower end of the supporting fitting 40 toward the outer peripheral side across the whole circumstance as shown in FIG. 2.

The cab mount 10 is also provided with a connector fitting 50 for connecting the supporting fitting 40 with the lower end of the inner cylindrical fitting 14. The connector fitting 50 is formed into a shape of pipe, and its upper end is fitted into the fitting section 32 of the inner cylindrical fitting 14 and its lower end is fitted into the connecting hole 44 of the supporting fitting 40.

The cab mount 10 is also provided with a ringed stopper fitting 52 disposed at an outer peripheral side of the connector fitting 50. The stopper fitting 52 is provided with a circular insertion through a hole 54 at its center and the connector fitting 50 penetrates through the stopper fitting 52 in the axial direction passing through the hole 54 formed at the center of the stopper fitting 52. The stopper fitting 52 is sandwiched and fixed between the lower end face of the inner cylindrical fitting 14 and the top plate 42 of the supporting fitting 40. At this time, the stopper fitting 52 is disposed so that the outer peripheral side of the upper face thereof faces to the lower end face of the rebound cushion 38 by leaving a predetermined distance (gap).

As shown in FIG. 3A, the connector fitting 50 is provided with an upper anchoring section 56 whose inner diameter expands gradually in the upper direction at the upper part thereof and is provided with a lower anchoring section 58 whose inner diameter expands gradually in the lower direction. The connector fitting 50 is press-fitted so that its upper end side is fitted into the fitting section 32 of the inner cylindrical fitting 14 and so that the outer peripheral side of the upper anchoring section 56 contacts in face-to-face with the anchored section 34. The connector fitting 50 is also press-fitted so that its lower end is fitted into the connecting hole 44 of the supporting fitting 40 and so that the outer peripheral side of the lower anchoring section 58 contacts in face-to-face with the anchored section 46. Thereby the supporting fitting 40 is connected and fixed to the lower end of the inner cylindrical fitting 14 through the intermediary of the connector fitting 50 and is sandwiched and fixed between the inner cylindrical fitting 14 and the supporting fitting 40 by being pressed by the stopper fitting 52.

When connecting the inner cylindrical fitting 14 with the supporting fitting 40 using the connector fitting 50, the lower anchoring section 58 of the connector fitting 50 may be formed by pressing or the like in advance before fitting the lower end of the connector fitting 50 into the connecting hole 44 of the supporting fitting 40, and the upper anchoring section 56 may be formed by crimping the upper end of the connector fitting 50 toward the outer peripheral side by means of a crimping jig (not shown) while fitting the upper end of the connector fitting 50 into the fitting section 32. As an alternative, it is possible to form the upper anchoring section 56 of the connector fitting 50 by pressing or the like in advance, before fitting the upper end of the connector fitting 50 into the fitting section 32, and to form the lower anchoring section 58 by crimping the lower end of the connector fitting 50 to the outer peripheral side by a crimping jig while fitting the lower end of the connector fitting 50 into the fitting section 32.

Further, as shown in FIG. 3B, it is also possible to fix the upper end of the connector fitting 50 to the inner cylindrical fitting 14 by arranging so that the outer diameter of the connector fitting 50 has an appropriate diameter for press-fitting into the fitting section 32 of the inner cylindrical fitting 14, and to press-fit the upper end of the connector fitting 50 into the inner peripheral side of the fitting section 32 without forming the upper anchoring section 56 at the upper end of the connector fitting 50. Although the fixing strength of the inner cylindrical fitting 14 with the connector fitting 50 drops in this case, as compared to the case of forming the upper anchoring section 56, this does not cause problems in the state in which the cab mount 10 is assembled between the car body 80 and the cab 82 in the truck or the like, because the connector fitting 50 and the inner cylindrical fitting 14 are fastened by a connecting bolt 90 and a nut 92 as shown in FIG. 1.

Furthermore, although the connector fitting 50 is constructed as a separate part from the inner cylindrical fitting 14 and the supporting fitting 40, the invention is not limited to that and the connector fitting 50 may be one formed integrally with the inner cylindrical fitting 14 or the supporting fitting 40 in advance.

As shown in FIG. 1, the cab mount 10 is provided with a dynamic damper 60 on the outer peripheral side of the supporting fitting 40. The dynamic damper 60 includes a substantially thin cylindrical holder fitting 62 disposed on the outer peripheral side of the supporting fitting 40, a cylindrical mass 64 fitted and fixed to the outer peripheral side of the holder fitting 62 and a substantially cylindrical elastic connector 66.

The holder fitting 62 is provided with a cylindrical portion 68 formed so that its outer diameter is substantially fixed at its upper end and a flange 70 bended and formed so as to extend from a lower end of the cylindrical portion 68 to the outer peripheral side. The mass 64 is molded by various metals and their alloy as its raw material and its surface is treated by rustproofing process as necessary. The mass 64 is formed so that its inner diameter corresponds to an outer diameter of the cylindrical portion 68.

The mass 64 is fixed to the holder fitting 62 by pressing from the outer peripheral side so that its inner diameter reduces in a state in which it is fitted into the outer peripheral side of the cylindrical portion 68 of the holder fitting 62 and a lower end face thereof abuts to an upper face of the flange 70. In contrary to that, it is possible to fix the holder fitting 62 with the mass 64 by pressing the cylindrical portion 68 from the inner peripheral side thereof so that the outer diameter expands or to fix the mass 64 to the holder fitting 62 by shrinkage fit, bonding, welding or the like.

The elastic connector 66 is provided with a cylindrical body 72 and an extension 74 formed in a body so as to extend from a lower end of the body portion 72 to the outer peripheral side. An inner peripheral surface of the body portion 72 is vulcanized and bonded to a lower par of the outer peripheral surface of the connector fitting 50 and an outer peripheral surface of the body portion 72 is vulcanized and boded to a lower part of the outer peripheral surface of the cylindrical portion 68. A lower face of the extending portion 74 is vulcanized and bonded to the damper stopper 48 of the supporting fitting 40 and its upper face is vulcanized and bonded to on inner peripheral surface of the flange 70 of the holder fitting 62. Thereby, the mass 64 is elastically connected to the lower part of the connector fitting 50 via the holder fitting 62 and the elastic connector 66.

The elastic connector 66 is provided with a bored portion 76 formed at an upper end of the elastic connector 66 so as to have a U-shape section and to extend in a peripheral direction and with a slit-like bored portion 78 formed on the outer peripheral surface of the extending portion 74 intermittently along the peripheral direction. Rigidity of the elastic connector 66 along a radial direction is adjusted mainly by the bored portion 76 and that along the axial direction is controlled by the bored portion 78.

The cab mount 10 constructed as described above is disposed between the car body 80 and the cab 82 in the truck and the like as shown in FIG. 1. A circular mounting hole 84 that penetrates through in the axial direction is perforated at position of for mounting the cab mount 10 to the car body 80. An inner diameter of the mounting hole 84 is slightly larger than an outer diameter of the stopper fitting 52 of the cab mount 10. Furthermore, an insertion hole 86 that penetrates through in the axial direction coaxially with the mounting hole 84 of the car body 80 is perforated through a floor part of the cab 82.

The pair of stays 20 of the outer cylindrical fitting 12 of the cab mount 10 is placed on the car body 80 and the part of the cab mount 10 lower than the pair of stays 20 is inserted through the mounting hole 84 of the car body 80 so that it projects out of the mounting hole 84. The car body 80 is provided with a screw hole 88 formed so as to correspond to the connecting hole 26 of the stay 20, the pair of the stays 20 is inserted through the connecting hole 26 and is fastened and fixed on the car body 80 by a bolt (not shown) screwed into the screw hole 88.

The flange portion 30 of the inner cylindrical fitting 14 of the cab mount 10 is abutted to the lower face of the cab 82 and a hollow section penetrating through the inner cylindrical fitting 14 is made to correspond to the insertion hole 86 of the cab 82. In this state, an axial section 94 of a connecting bolt 90 is inserted from the insertion hole 86 through the inner peripheral side of the inner cylindrical fitting 14 and the connector fitting 50, and a nut 92 is screwed onto the leading end of the axial section 94 that projects from the cylindrical portion 68 of the connector fitting 50, until predetermined fastening torque is generated. Thereby, the outer cylindrical fitting 12 of the cab mount 10 is connected and fixed to the car body 80 through the pair of bolts, and the inner cylindrical fitting 14 is connected and fixed to the cab 82 through the connecting bolt 90 and the nut 92.

Here, the mass of the mass 64 and the rigidity of the elastic connector 66 of the dynamic damper 60 are set so as to correspond to resonance frequency of the cab 82. Thereby, when the cab 82 generates vibration coinciding with the resonance frequency, the mass 64 of the dynamic damper 60 connected to the cab 82 via the outer cylindrical fitting 12 also causes resonating vibration.

Operation of the Embodiment

Next, an operation of the cab mount 10 of the embodiment constructed as described above will be explained.

When the truck or the like travels, vibration caused by an engine loaded on the car body 80 and vibration caused by tires in running over irregularities of a road surface are transmitted to the cab mount 10. At this time, the vibration transmitted from the car body 80 to the cab 82 may be reduced because the elastic body 16 of the cab mount 10 blocks the vibration between the car body 80 and the cab 82 by elastically deforming between the outer cylindrical fitting 12 and the inner cylindrical fitting 14 and the elastic body 16 damps and absorbs the vibration.

Furthermore, in the cab mount 10, one end of the connector fitting 50 is fitted and fixed into one end of the inner peripheral side of the inner cylindrical fitting 14, and the other end of the connector fitting 50 is fitted and fixed into the connecting hole 44 of the supporting fitting 40, the supporting fitting 40 is thereby connected and fixed to the inner cylindrical fitting 14 via the connector fitting 50, and the dynamic damper 60 is connected and fixed to the lower end of the inner cylindrical fitting 14. It is therefore possible to reliably transmit to the dynamic damper 60 vibration generated in the cab 82, or that has been transmitted, through the connector fitting 50 and the supporting fitting 40, as well as through the connecting bolt 90 and the nut 92.

Because the mass of the mass 64 and the rigidity of the elastic connector 66 along an amplitude direction have been set corresponding to the resonance frequency of the cab 82, resonance vibration is also generated in the mass 64 when vibration of the resonance frequency occurs in the cab 82. It is then possible to effectively lower a vibration level of the resonance vibration caused in the cab 82 by inertia force of the mass 64.

As a result, according to the cab mount 10, because it is possible, after the dynamic damper 60 containing the mass 64 and the elastic connector 66 has been connected with the inner cylindrical fitting 14 to provide a part of the apparatus (the cab mount 10), to mount the dynamic damper 60 and the apparatus assembled together as a body to the vibration generating section and the vibration receiving section, work of mounting the dynamic damper separately from the cab mount may be eliminated. Still more, because the dynamic damper 60 is assembled in a body as part of the cab mount 10, it becomes possible to reduce the total production cost of the cab mount 10 and the dynamic damper 60.

It is noted that when an excessive load is applied to the inner cylindrical fitting 14 of the cab mount 10 in a bound direction (in a direction of an arrow B in FIG. 1), the flange portion 30 of the inner cylindrical fitting 14 abuts against the upper end of the elastic body 16 through the intermediary of the bound cushion 36 to prevent an excessive relative displacement of the inner cylindrical fitting 14 in the bound direction. Still more, when an excessive load is applied to the inner cylindrical fitting 14 of the cab mount 10 in a rebound direction (direction of an arrow R in FIG. 1), the outer peripheral side of the stopper fitting 52 abuts against the lower end of the outer cylindrical fitting 12 through the intermediary of the rebound cushion 38 to prevent an excessive relative displacement of the inner cylindrical fitting 14 in the rebound direction.

Furthermore, when connecting the inner cylindrical fitting 14 with the supporting fitting 40 by the connector fitting 50 of the cab mount 10, it is possible to assemble the dynamic damper 60, the supporting fitting 40 and the stopper fitting 52 respectively to the connector fitting 50 in advance and to assemble them as a sub-assemble to the body including the inner cylindrical fitting 14, the outer cylindrical fitting 12 and the elastic body 16, by forming the lower anchoring section 58 of the connector fitting 50 by pressing or the like before fitting the lower end of the connector fitting 50 into the connecting hole 44 of the supporting fitting 40, and by forming the upper anchoring section 56 by crimping the upper end of the connector fitting 50 to the outer peripheral side with a crimping jig (not shown) when the upper end of the connector fitting 50 is inserted into the fitting section 32.

As a result, according to the cab mount 10 of the embodiment, it is possible to select one that fits to the resonance frequency of the cab mount 10 among the sub-assemblies and to assemble the sub-assembly to the body by preparing the plurality of kinds of sub-assemblies whose tuning of the dynamic damper 60 is different from each other in advance. Therefore, it is possible to arrange so that only the sub-assembly fits readily to the cab mount 10 while making the body in common.

It is noted that although the outer cylindrical fitting 12 is connected to the car body 80 side and the inner cylindrical fitting 14 is connected to the cab 82 side in the cab mount 10 of the present embodiment, it is possible to connect the outer cylindrical fitting 12 to the cab 82 side and to connect the inner cylindrical fitting 14 so as to the car body 80 side to reduce the resonance vibration of the car body 80 by the dynamic damper 60.

What is claimed is:

1. A vibration isolator, comprising:
   an outer tube connected to one of a vibration generating section or a vibration receiving section;
   an inner tube disposed inside of the outer tube and connected to the other one of the vibration generating section or the vibration receiving section;
   an elastic body disposed between the outer tube and the inner tube to elastically connect the outer tube and the inner tube;
   a substantially cylindrically shaped supporting member disposed outside in the axial direction of the inner tube;
   a cylindrical connecting member, a first end thereof being inserted to fit into an inner peripheral side of the inner tube and a second end thereof being inserted to fit into an inner peripheral side of the supporting member, the supporting member being connected with the inner tube so as to displace together;
   a mass disposed on an outer peripheral side of the supporting member; and
   an elastic connector fixed to the supporting member and to the mass so as to elastically connect the mass with the connecting member;
   wherein a rebound stopper formed into a ring having a larger diameter than an external diameter of the outer tube is disposed on the outer peripheral side of the connecting member, the rebound stopper being sandwiched and fixed between the inner tube and the supporting member.

2. The vibration isolator according to claim 1, further comprising:
   a first anchored section formed at a region of the inner peripheral surface of the inner tube corresponding to the first end of the connecting member, the first anchored section being formed by an increase in the inner diameter of the inner tube;
   a second anchored section formed at a region of the inner peripheral surface of the supporting member corresponding to the second end of the connecting member, the second anchored section being formed by an increase in the inner diameter of the supporting member;
   a first anchoring section formed so that there is an increase in diameter of the connecting member to the outer peripheral side at the first end of the connecting member, the first anchoring section anchoring the first anchored section; and
   a second anchoring section formed so there is an increase in diameter of the connecting member to the outer peripheral side at the second end of the connecting member, the second anchoring section anchoring the second anchored section.

3. The vibration isolator according to claim 2, wherein at least one of the first or the second anchoring sections is formed by crimping the connecting member while the connecting member is inserted to fit into the inner peripheral side of the inner tube or into the inner peripheral side of the supporting member.

4. The vibration isolator according to claim 1, wherein the first end of the connecting member is fixed to the inner peripheral side of the inner tube by press fitting.

5. The vibration isolator according to claim 1, wherein there is a stay portion formed curving around to extend out to the outer peripheral side at the axial end of the outer tube that is on the opposite end from that of the connecting member, and the outer tube is connected and fixed to one of the vibration generating section or the vibration receiving section via the stay portion.

6. A method for mounting a vibration isolator that comprises:
   an outer tube connected to one of a vibration generating section or a vibration receiving section;
   an inner tube disposed inside of the outer tube and connected to the other one of the vibration generating section or the vibration receiving section;
   an elastic body disposed between the outer tube and the inner tube to elastically connect the outer tube and the inner tube;
   a substantially cylindrically shaped supporting member disposed outside in the axial direction of the inner tube;
   a mass disposed on an outer peripheral side of the supporting member; and
   an elastic connector fixed to the supporting member and to the mass so as to elastically connect the mass with the supporting member, wherein
   the method comprises:
   connecting the supporting member and the inner tube so that the supporting member displaces together with the inner tube by inserting a first end of a connecting member to fit into an inner peripheral side of the inner tube, and by inserting a second end of the connecting member to fit into an inner peripheral side of the supporting member; and then
   mounting the supporting member and the inner tube that have been connected together to the other one of the vibration generating section or the vibration receiving section;
   wherein a rebound stopper formed into a ring having a larger external diameter than that of the outer tube is disposed on the outer peripheral side of the connecting member, the rebound stopper being sandwiched and fixed between the inner tube and the supporting member.

7. The method for mounting the vibration isolator according to claim 6, further comprising:
   forming a first anchoring section by an increase in a diameter of the first end of the connecting member to an outer peripheral side so that the first end of the connecting member is anchored to a first anchored section, the first anchored section being formed at a region of the inner peripheral surface of the inner tube corresponding to the first end of the connecting member by an increase in a part of an inner diameter of the inner tube; and
   forming a second anchoring section by an increase in a diameter of the second end of the connecting member to the outer peripheral side so that the second end of the connecting member is anchored to a second anchored section, the second anchored section being formed at a region of the inner peripheral surface of the supporting member corresponding to the second end of the connecting member by an increase in a part of an inner diameter of the supporting member.

8. The method for mounting the vibration isolator according to claim 7, wherein at least one of the first or the second anchoring sections is formed by crimping the connecting member while the connecting member is inserted to fit into the inner peripheral side of the inner tube or into the inner peripheral side of the supporting member.

9. The method for mounting the vibration isolator according to claim 7, wherein the connecting member is fixed to the inner tube by press fitting the first end of the connecting member into the inner peripheral side of the inner tube.

10. The method for mounting the vibration isolator according to claim 6, further comprising:
   bending and forming a stay portion to extend out to the outer peripheral side at the axial end of the outer tube that is on the opposite end from that of the connecting member, and
   mounting the supporting member and the inner tube that have been connected together to the other one of the vibration generating section or the vibration receiving section by a fastening member which connects and fixes the outer tube to one of the vibration generating section or the vibration receiving section via the stay portion and which penetrates through a hollow hole of the connecting member.

11. A vibration isolator, comprising:
   an outer tube connected to one of a vibration generating section or a vibration receiving section;
   an inner tube disposed inside of the outer tube and connected to the other one of the vibration generating section or the vibration receiving section;
   an elastic body disposed between the outer tube and the inner tube to elastically connect the outer tube and the inner tube;
   a substantially cylindrical shaped supporting member disposed outside in the axial direction of the inner tube;
   a mass disposed on an outer peripheral side of the supporting member; and
   an elastic connector fixed to the supporting member and to the mass so as to elastically connect the mass with the supporting member, wherein
   the supporting member is connected with the inner tube so that the supporting member displaces together with the inner tube by inserting a first end of a connecting member to fit into the inner peripheral side of the inner tube and by inserting a second end of the connecting member to fit into the inner peripheral side of the supporting member, and then the supporting member and the inner tube that have been connected together are mounted to the other one of the vibration generating section or the vibration receiving section by a fastening member which penetrates through a hollow hole of the connecting member;
   wherein a rebound stopper formed into a ring having a larger external diameter than that of the outer tube is disposed on the outer peripheral side of the connecting member, the stopper being sandwiched and fixed between the inner tube and the supporting member.

12. The vibration isolator according to claim 11, wherein
   a first anchoring section is formed by an increase in a diameter of the first end of connecting member to an outer peripheral side so that the first end of the connecting member is anchored to a first anchored section, the first anchored section being formed at a region of the inner peripheral surface of the inner tube corresponding to the first end of the connecting member by an increase in a part of an inner diameter of the inner tube; and
   a second anchoring section is formed by an increase in a diameter of the second end of the connecting member to the outer peripheral side so that the second end of the connecting member is anchored to a second anchored section, the second anchored section being formed at a region of the inner peripheral surface of the supporting member corresponding to the second end of the connecting member by an increase in a part of an inner diameter of the supporting member.

13. The vibration isolator according to claim 12, wherein at least one of the first or the second anchoring sections is formed by crimping the connecting member while the connecting member is inserted to fit into the inner peripheral side of the inner tube or the inner peripheral side of the supporting member.

14. The vibration isolator according to claim 12, wherein the connecting member is fixed to the inner tube by press fitting the first end of the connecting member into the inner peripheral side of the inner tube.

15. The vibration isolator according to claim 11, wherein a stay portion is bent and formed to extend out to the outer peripheral side at the axial end of the outer tube that is at the opposite end from that of the connecting member, and the supporting member and the inner tube that have been connected together are mounted to the other one of the vibration generating section or the vibration receiving section by a fastening member which connects and fixes the outer tube to one of the vibration generating section or the vibration receiving section via the stay portion and which penetrates through a hollow hole of the connecting member.

* * * * *